US009009613B2

(12) United States Patent
Edwards et al.

(10) Patent No.: US 9,009,613 B2
(45) Date of Patent: *Apr. 14, 2015

(54) SYSTEM TO OVERLAY APPLICATION HELP ON A MOBILE DEVICE

(75) Inventors: Andrew S. M. Edwards, Southampton (GB); Gregory Lubel, Southampton (GB); Anthony H. Phillips, Southampton (GB); Sam Rogers, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 365 days.

This patent is subject to a terminal disclaimer.

(21) Appl. No.: 13/406,701

(22) Filed: Feb. 28, 2012

(65) Prior Publication Data
US 2013/0007613 A1 Jan. 3, 2013

Related U.S. Application Data

(62) Division of application No. 13/173,113, filed on Jun. 30, 2011.

(51) Int. Cl.
G06F 3/048 (2013.01)
G06F 3/01 (2006.01)
G06F 3/0489 (2013.01)
G06F 9/44 (2006.01)

(52) U.S. Cl.
CPC .............. G06F 3/01 (2013.01); G06F 3/04895 (2013.01); G06F 9/4446 (2013.01); G06F 9/4445 (2013.01)

(58) Field of Classification Search
CPC ............................. G06F 9/4446; G06F 3/0416
See application file for complete search history.

(56) References Cited

U.S. PATENT DOCUMENTS

| 2005/0046706 | A1* | 3/2005 | Sesek et al. | 348/231.3 |
| 2006/0240862 | A1* | 10/2006 | Neven et al. | 455/550.1 |
| 2009/0088197 | A1* | 4/2009 | Stewart | 455/550.1 |
| 2010/0125407 | A1* | 5/2010 | Cho et al. | 701/201 |
| 2010/0250136 | A1* | 9/2010 | Chen | 701/300 |

* cited by examiner

Primary Examiner — William Bashore
Assistant Examiner — Rayeez Chowdhury
(74) Attorney, Agent, or Firm — Steven M. Greenberg, Esq.; CRGO Law

(57) ABSTRACT

A method, system, and computer program product for displaying help information on a mobile device is provided. The method can include receiving from a mobile device an image of a GUI for a computing application displayed in a separate computer. The method additionally can include determining from the image a subject portion of the computing application and retrieving help information from the computing application corresponding to the subject portion of the computing application. Finally, the method can include returning the help information to the mobile device for display in the mobile device.

5 Claims, 3 Drawing Sheets

SYSTEM TO OVERLAY APPLICATION HELP ON A MOBILE DEVICE

CROSS-REFERENCE TO RELATED APPLICATIONS

This application is a Divisional of U.S. application Ser. No. 13/173,113, filed Jun. 30, 2011, currently pending, the entirety of which is incorporated herein by reference.

BACKGROUND OF THE INVENTION

1. Field of the Invention

The present invention relates to the field of help processing for computer programs and more particularly to provide help information on a mobile device.

2. Description of the Related Art

Computing applications have always included user help, including the rudimentary "read me" document, the more advanced help index accessible from a menu bar, and with the advent of the Web, a direct hyperlink from the computer program to a remote, Web site of help content. Of course, help content always could be found within the user manual of the computer program, if a user manual even exists. Notwithstanding, relying upon help in a user manual is not desirable in as much as the user manual once printed rapidly can become out of date or plain wrong—particularly in the face of continuous product patching, updating, and upgrading of the computer program.

Help for the computer program has typically involved a user requesting help for a computer program by selecting a button. The help information once displayed, whether a "read me" document, a Web site, or anything else, is often general; only describing the computer program in general. In addition, the help information displayed often hides the computer program for which the user is seeking help. Therefore, the user must move the help in order to read the displayed help information and view the computer program simultaneously. In this way, seeking help can interrupt the natural flow of a person using a computer program.

BRIEF SUMMARY OF THE INVENTION

Embodiments of the present invention address deficiencies of the art in respect to displaying help information and provide a novel and non-obvious method, system, and computer program product for displaying help information on a mobile device. In an embodiment of the invention, a method for displaying help information on a mobile device can include receiving from a mobile device an image of a GUI for a computing application displayed in a separate computer. The method additionally can include determining from the image a subject portion of the computing application and retrieving help information from the computing application corresponding to the subject portion of the computing application. Finally, the method can include returning the help information to the mobile device for display in the mobile device.

In one aspect of the embodiment, the subject portion of the computing application is determined from coordinates mapping to a focus point in the image. In another aspect of the embodiment, a web service receives the image from the mobile device, provides the coordinates to the computing application, receives the help information from the computing application, and returns the help information to the mobile device. In yet another aspect of the embodiment, image processing is used to ascertain a title of a specific GUI corresponding to the image and the specific GUI having the ascertained title is identified upon searching all the GUIs for the computing application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the display of help information on a mobile device. In accordance with an embodiment of the invention, an end user seeking help in respect to the operation of a computer can acquire with a mobile computing device an image of a portion of the subject portion of the computer. The image can include a focus point, for instance visual cross hairs, centered upon the subject portion of the computer. The mobile device can transmit the image to a web service enabled to serve help content corresponding to different subject portions of the computer. In this regard, the web service can respond to the receipt of the image by identifying through image processing the subject portion of the image, and can retrieve from the computer associated help content. Finally, the web service can return the retrieved help content to the mobile device for display in the mobile device. In this way, help for the subject portion of the primary device can be provided through the mobile device while requiring the end user only to acquire an image of the subject portion of the computer.

Figure 1:
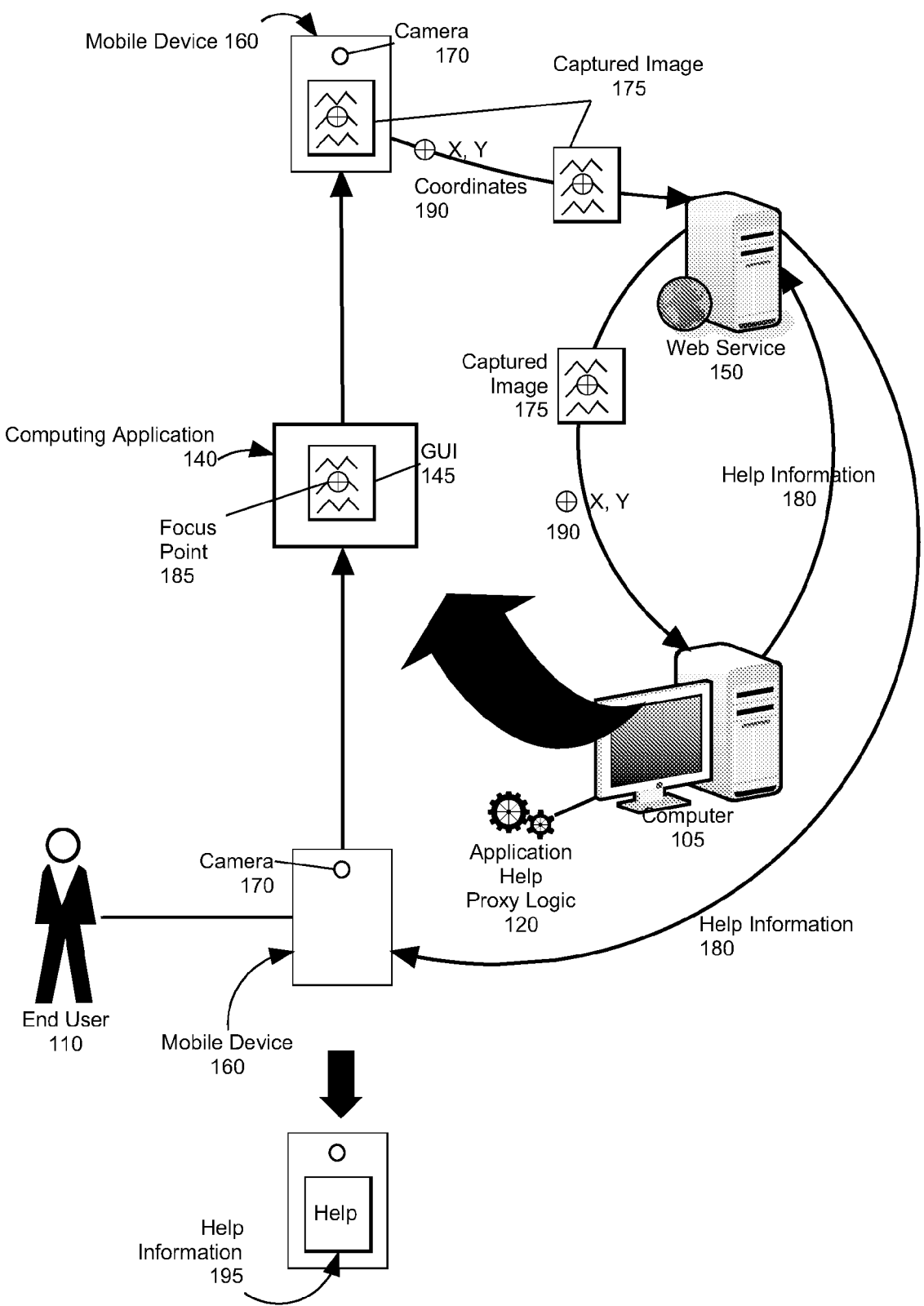
FIG. 1 is a pictorial illustration of a process for displaying help information on a mobile device.

In further illustration, FIG. 1 pictorially shows a process for displaying help information 195 on a mobile device 160. As shown in FIG. 1, an end user 110 can seek help information for a subject portion of a graphical user interface (GUI) 145 displayed in concert with the operation of a computing application 140 in memory of a computer 105. Of note, the subject portion can be a widget rendered in connection with the GUI 145, or a complete region of the GUI 145, the entire GUI 145, or the entire computing application 140. In seeking the help information, the end user 110 can acquire through camera 170 of a mobile device 160 an image 175 of at least a portion of the GUI 145. The image 175 can include a focus point 185, such as visual cross hairs, centered upon the subject portion of the GUI 145. To facilitate the centering of the focus point 185 upon the subject portion, the end user 110 can engage in zooming operations with respect to the camera 170.

The image 175 can be transmitted to a help web service 150 that can process the image 175 to determine coordinates 190 for the focus point 185. Thereafter, the web service 150 can store both the image 175 and the coordinates 190 in a data store (not shown). Application help proxy logic 120 executing in memory of computer 105 can poll the web service 150 and detect when an image 175 and coordinates 190 have been stored in connection with a help request. In response, the proxy logic 120 can map the coordinates 190 to the subject portion and retrieve help information 180 for the subject portion.

For example, image processing techniques can be used to ascertain a title of the specific portion of the GUI 145 corresponding to the coordinates 190. Then application help proxy logic 120 then can search all the windows of the computing application 140 to locate a matching title. Once the specific portion of the GUI 145 is identified, a data store of help information can be cross-referenced for the specific portion of the GUI 145 is and help information 180 retrieved accordingly. Thereafter, the proxy logic 120 can return the help information 180 to the web service 150 that in turn can route the help information 180 for display in the mobile device 160. Optionally, the mobile device 160 can periodically poll the web service 150 for the help information 180 until such time as the web service 150 responds with the help information 180.

Figure 2:
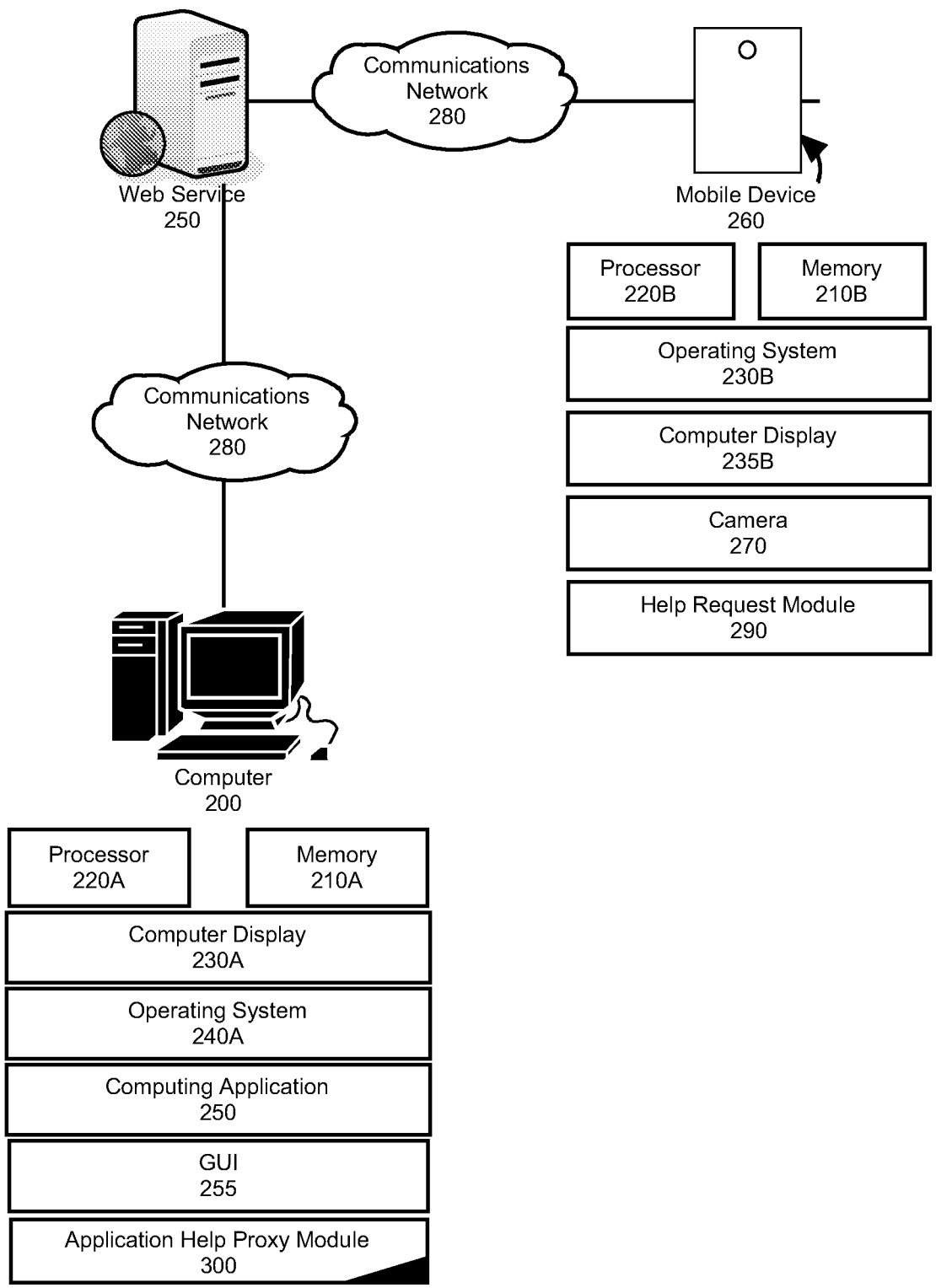
FIG. 2 is a schematic illustration of a data processing system configured for displaying help information on a mobile device for a computing application executing on another device; and, FIG. 3 is a flow chart illustrating a process for displaying help information on a mobile device for a computing application executing on another device.

The process described in connection with FIG. 1 can be implemented in a mobile help data processing system. In further illustration, FIG. 2 schematically shows a mobile help data processing data processing system configured for displaying help information on a mobile device 260 for a computing application 250 executing on a computer 200 communicatively coupled to one another over computer communications network 280. The computer 200 can include at least one processor 220A and memory 210A supporting the execution of an operating system (O/S) 240A. The O/S 240A in turn can support the operation of the computing application 250. A GUI 255 can be provided as part of the computer application 250. Finally, the O/S 240A can also support the execution of an application help proxy module 300.

Likewise, the mobile device 260 can include at least one processor 220B and memory 210B supporting the execution of an operating system (O/S) 230B. The O/S 230B in turn can support the operation of a computer display 235B and a camera 270. The O/S 230B can also support the execution of a help request module 290. The help request module 290 can include program code to issue help requests to coupled web service 250 in connection with an image of a subject portion of the GUI 255 of the computing application 250 acquired by camera 270.

Of note, the application help proxy module 300 can include program code enabled upon execution in the memory 210A of the computer 200 to communicate with a web service 250 via communications network 280. In this regard, the program code can identify a request pending in the web service 250 to display help information for a subject portion of the GUI 255. Upon finding the request on the web service 250, the application help proxy module 300 can download the image and coordinates for a corresponding focus point. The image can then be processed by the application help proxy module 300 to determine the subject portion of the GUI 255 that corresponds to the image. In one instance, image processing can be used to ascertain a title of the specific GUI 255 mapping to the coordinates.

The application help proxy module 300 can then search all the GUIs in a computer application 240 using the title obtained with image processing to identify a match. Upon identifying the specific GUI 255, application help proxy module 300 can collect the help information associated with the subject portion of the GUI 255. In one instance, this can be accomplished by the application help proxy module 300 by using the location of the focus point to provide a relative location of the subject portion of the GUI 255 upon identifying the specific GUI. The application help proxy module 300 can then identify the subject portion, for which the end user seeks help information for, by searching all the portions of the GUI 255 for a match to the coordinates for the identified GUI. The application help proxy module 300 can then determine the help information available for the identified subject portion. Upon collecting the available help information for the identified subject portion, the application help proxy module 300 can send the help information to the web service 250. The mobile device 260, in turn, in polling the web service 250 can detect the help information returned in response to the request and the help information can be displayed by the help request module 290 on the computer display 235B of the mobile device 260.

Figure 3:
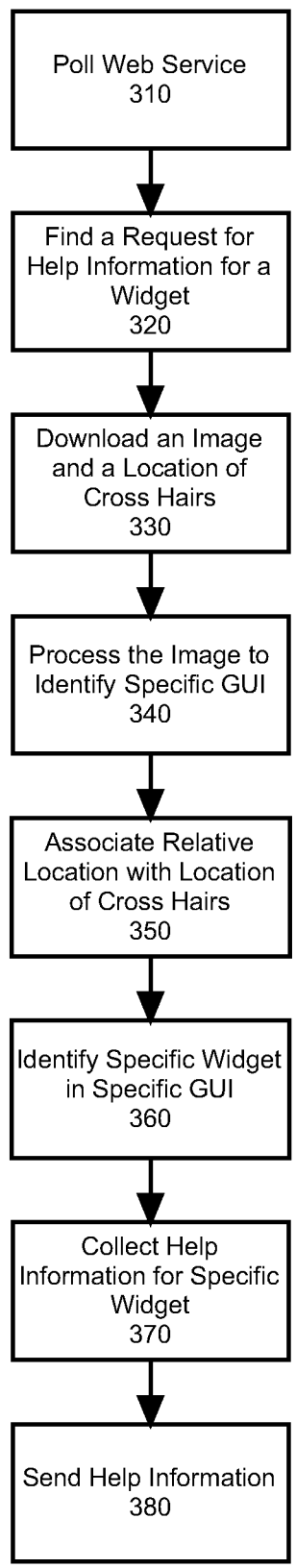

In even yet further illustration of the operation of the program code of the application help proxy module 300, FIG. 3 is a flow chart illustrating a process for displaying help information on a mobile device for a GUI in a computing application executing on a different device. Beginning in step 310, a web service is polled. In step 320, a request for help information for a subject portion of a GUI is found on the web service upon polling the web service. Of note, the request for help information can be the result of an end user using a camera coupled to a mobile device to capture an image containing a specific subject portion of the GUI for which the end user seeks help information; the image and the location of a focus point can be sent to the web service . Of further note, the end user can use the focus point to target a specific widget.

The image and the location of coordinates corresponding to the focus point are downloaded, as indicated in step 330, upon finding the request for help information on the web service. As indicated in step 340, the image can then be processed to identify the specific GUI. Processing the image can include using image processing to ascertain a title of the specific GUI that the coordinates are located within. The title of the specific GUI, for which the subject portion of interest is located within, can then be used to identify the specific GUI having the ascertained title upon searching all GUIs in the computing application.

Upon finding the specific GUI in which the subject portion of the GUI is located, the coordinates for the focus point can be associated with a relative location in the specific GUI, as referenced in step 350. In step 360, the subject portion of the GUI corresponding to the relative location in the specific GUI is identified. In one instance, the specific subject portion of the GUI can be identified by searching all portions of the GUI for a match to the relative location for the specific GUI. The help information for the identified subject portion of the GUI can then be collected, as referenced in step 370, upon the identification of the subject portion of the GUI and the determination of what help information is available for the identified subject portion of the GUI. Once the help information is identified for the specific subject portion of the GUI, the help information can be sent to the web service, as seen in step 380. Thereafter, the help information can be displayed to the computer display of a mobile device, upon the mobile device finding a reply to its request for help information on the web service.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for displaying help information on a mobile device comprising:
    receiving an image from a camera of a mobile device, the image being of a graphical user interface (GUI) for a computing application being displayed on a separate computer;
    determining, by a processor of a server, from the image a subject portion of the computing application based upon a location of a focus point on the image;
    retrieving help information for the computing application from the server corresponding to the subject portion of the image of the computing application; and,
    returning the help information to the mobile device for display in the mobile device.

2. The method of claim 1, wherein the location of the focus point the subject portion of the computing application is determined from coordinates mapping to the focus point in the image.

3. The method of claim 2, wherein the server is a web service that receives the image from the mobile device, provides the coordinates to the computing application, receives the help information from the computing application, and returns the help information to the mobile device.

4. The method of claim 1, further comprising:
    using image processing to ascertain a title of a specific GUI corresponding to the image; and,
    identifying the specific GUI having the ascertained title upon searching all the GUIs for the computing application.

5. The method of claim 1, wherein the focus point is visual cross hairs.

* * * * *